(12) United States Patent
Wei et al.

(10) Patent No.: US 9,362,839 B2
(45) Date of Patent: Jun. 7, 2016

(54) POWER CONVERTER WITH COMMON MODE VOLTAGE REDUCTION

(75) Inventors: Lixang Wei, Whitefish Bay, WI (US); Zhongyuan Cheng, Ontario (CA); Yuan Xiao, Kitchener (CA); Navid R. Zargari, Cambridge (CA)

(73) Assignee: Rockwell Automation Technologies, Inc., Mayfield Hts., OH (US)

( * ) Notice: Subject to any disclaimer, the term of this patent is extended or adjusted under 35 U.S.C. 154(b) by 865 days.

(21) Appl. No.: 13/024,056

(22) Filed: Feb. 9, 2011

(65) Prior Publication Data

US 2012/0201056 A1 Aug. 9, 2012

(51) Int. Cl.
*H02M 5/458* (2006.01)
*H02P 21/00* (2016.01)

(52) U.S. Cl.
CPC ......... *H02M 5/4585* (2013.01); *H02P 21/0003* (2013.01)

(58) Field of Classification Search
CPC ..... H02M 5/293; H02M 5/40; H02M 1/4216; H02M 1/4233; H02M 2001/0012
USPC .............................. 363/37, 34, 35, 40, 41, 44
See application file for complete search history.

(56) References Cited

U.S. PATENT DOCUMENTS

| | | | |
|---|---|---|---|
| 6,166,929 A | 12/2000 | Ma et al. | |
| 6,269,010 B1 | 7/2001 | Ma et al. | |
| 6,359,416 B1 | 3/2002 | Rao et al. | |
| 6,366,483 B1 | 4/2002 | Ma et al. | |
| 6,469,916 B1 | 10/2002 | Kerkman et al. | |
| 6,477,067 B1 | 11/2002 | Kerkman et al. | |
| 6,541,933 B1 | 4/2003 | Leggate et al. | |
| 6,617,821 B2 | 9/2003 | Kerkman et al. | |
| 6,636,012 B2 | 10/2003 | Royak et al. | |
| RE38,439 E * | 2/2004 | Czerwinski ..................... 363/44 |
| 6,703,809 B2 | 3/2004 | Royak et al. | |
| 6,720,748 B1 | 4/2004 | Seibel et al. | |
| 6,819,070 B2 | 11/2004 | Kerkman et al. | |
| 6,819,077 B1 | 11/2004 | Seibel et al. | |
| 6,842,354 B1 | 1/2005 | Tallam et al. | |
| 6,859,374 B2 * | 2/2005 | Pollanen et al. ................ 363/69 |
| 6,982,533 B2 | 1/2006 | Seibel et al. | |
| 7,034,501 B1 | 4/2006 | Thunes et al. | |
| 7,106,025 B1 | 9/2006 | Yin et al. | |
| 7,164,254 B2 | 1/2007 | Kerkman et al. | |
| 7,215,559 B2 | 5/2007 | Nondahl et al. | |
| 7,274,576 B1 | 9/2007 | Zargari et al. | |
| 7,336,509 B2 | 2/2008 | Tallam | |
| 7,342,380 B1 | 3/2008 | Kerkman et al. | |
| 7,356,441 B2 | 4/2008 | Kerkman et al. | |
| 7,400,518 B2 | 7/2008 | Yin et al. | |
| 7,471,525 B2 | 12/2008 | Suzuki et al. | |
| 7,495,410 B2 * | 2/2009 | Zargari et al. ................. 318/729 |

(Continued)

OTHER PUBLICATIONS

Han Ju Cha and Parsa Enjeti, An Approach to Reduce Common-Mode Voltage in Matrix Converter, Jul./Aug. 2003, IEEE vol. 39, pp. 1151-1159.*

(Continued)

*Primary Examiner* — Timothy J Dole
*Assistant Examiner* — Yusef Ahmed
(74) *Attorney, Agent, or Firm* — Fay Sharpe LLP

(57) ABSTRACT

Power conversion systems are presented with common mode reduction by space vector pulse width modulation zero vector selection to counteract common mode contribution of active vectors.

13 Claims, 12 Drawing Sheets

(56) References Cited

U.S. PATENT DOCUMENTS

| | | | |
|---|---|---|---|
| 7,495,938 | B2 | 2/2009 | Wu et al. |
| 7,511,976 | B2 | 3/2009 | Zargari et al. |
| 7,589,984 | B2 * | 9/2009 | Salomaki ............ 363/41 |
| 8,040,101 | B2 * | 10/2011 | Itoh et al. ............ 318/801 |
| 8,138,697 | B2 * | 3/2012 | Palma ............ 318/400.02 |
| 2007/0211501 | A1 | 9/2007 | Zargari et al. |
| 2007/0297202 | A1 | 12/2007 | Zargari et al. |
| 2008/0180055 | A1 | 7/2008 | Zargari et al. |
| 2009/0128083 | A1 | 5/2009 | Zargari |
| 2009/0184681 | A1 * | 7/2009 | Kuno ............ 320/128 |
| 2010/0025995 | A1 | 2/2010 | Lang et al. |
| 2010/0080028 | A1 | 4/2010 | Cheng et al. |
| 2010/0091534 | A1 * | 4/2010 | Tadano ............ 363/157 |

OTHER PUBLICATIONS

Han Ju Cha, Analysis and Design of MAtrix Converter fro Adjustable Speed Drive and Distributed Power Sources, Aug. 2004, Texas A & M Uninversity, Doctor of Philosphy Desertation Paper.*

Lin Hua, A Modulation Strategy to Reduce Common-Mode Voltage for Current-Controlled Matrix Converters, Nov. 2006, IEEE Xplore, 2775-2780.*

Emre Un and Ahmet M. Hava, "A High Performance PWM Algorithm for Common Mode Voltage Reduction in Three-Phase Voltage Source Inverters", 2008 IEEE.

Taiwan Patent Application TW439350, Jun. 7, 2001.

Emre Un and Ahmet M. Hava, "A Near State PWM Method With Reduced Switching Frequency and Reduced Common Mode Voltage for Three-Phase Voltage Source Inverters", 2007 IEEE.

A.M.De Broe, A.L. Julian, and T.A Lipo, "Neutral-To-Ground Voltage Minimization in a PWM-Rectifier/Inverter Configuration", Power Electronics and Variable Speed Drives, Sep. 23-25, 1996, Conference Publication No. 429, IEEE, 1996.

Jay M. Erdmna, Russel J. Kerkman, David W. Schlegel, and Gary L. Skibinski, "Effect of PWM Inverters on AC Motor Bearing Currents and Shaft Voltages", 1996 IEEE.

A. Muetze & A. Binder, "Don't lose Your Bearings", Mitigation techniques for bearing currents in inverter-supplied drive systems, 2006 IEEE.

Yeb-Shin Lai and Fu-San Shyu, "Optimal Common-Mode Voltage Reduction PWM Technique for Inverter Control with Consideration of the Dead-Time Effects-Part 1: Basic Development", 2004 IEEE.

Qiang Yin, Russel J. Kerkman, Thomas A. Nondahl, and Haihui Lu, "Analytical Investigation of the Switching Frequency Harmonic Characteristic for Common Mode Reduction Modulator", 2005 IEEE.

Russel J. Kerkman, David Leggate, Dave Schlegel, and Gary Skibinski, "PWM Inverters and Their Influence on Motor Over-Voltage," 1997 IEEE.

Hyeoun-Dong Lee and Seung-Ki Sul, "A Common Mode Voltage Reduction in Boost Rectifier/Inverter System by Shifting Active Voltage Vector in a Control Period", IEEE Transactions on Power Electronics, vol. 15, No. 6, Nov. 2000.

* cited by examiner

POWER CONVERTER WITH COMMON MODE VOLTAGE REDUCTION

BACKGROUND

Motor drives and other power conversion systems operate to convert electrical power from one form to another and may be employed in a variety of applications such as powering an electric motor using power converted from a single or multiphase AC input source. Such power converters are typically constructed using a passive or active rectifier to convert input AC power to an intermediate DC, followed by an active inverter stage that converts the intermediate DC to AC output power to drive a motor, power grid, or other load. Matrix converters provide AC-AC conversion, typically without internal DC storage elements. The matrix converter or rectifier/inverter stages generally include switches actuated through various forms of pulse width modulation (PWM), where the PWM switching states used in the rectifier and inverter may be constructed according to selective harmonic elimination (SHE or SHEPWM) or space vector modulation (SVM or SVPWM) or other PWM techniques.

Current source converter (CSC) type drives use the rectifier to provide a controlled DC current in an intermediate DC link circuit, which is then converted by the inverter into drive currents provided to the load, where the link circuit includes one or more inductances, such as a link choke. Voltage source converters (VSCs) regulate the DC voltage across a capacitance in the intermediate circuit and a voltage source inverter (VSI) generates output waveforms by converting the intermediate DC bus voltage. In a common medium voltage drive configuration, switches of an active rectifier are pulse width modulated according to an SHE scheme, and the inverter stage is controlled by SHEPWM when the output frequency is high, and SVPWM may be used for low inverter output frequencies.

It is often important to control the amount of common mode voltages and currents seen by conversion system components and by the load in motor drives and other power converters. For instance, motors are susceptible to damage or performance degradation caused by appearance of excessive common mode voltages on the motor leads. In voltage source converters, the common mode voltage at the load output is related to the regulated DC link voltage, and thus common mode voltage control techniques have been advanced which carefully select VSI inverter switching patterns to reduce output common mode voltages.

U.S. Pat. No. 7,164,254 to Kerkman et al., issued Jan. 16, 2007 and assigned to the assignee of the present application discloses common mode voltage reduction techniques in which the switching sequence is modified to avoid using the zero vectors in order to reduce common mode voltages in the motor. The entirety of this patent is hereby incorporated by reference as if fully set forth herein.

U.S. Pat. No. 7,106,025 to Yin et al., issued Sep. 12, 2006 and assigned to the assignee of the present application discloses techniques for canceling dead time effects in the algorithm to reduce common mode voltages produced by a three-phase power conversion device in a rectifier/inverter variable frequency drive (VFD), the entirety of which is hereby incorporated by reference as if fully set forth herein.

U.S. Pat. No. 6,819,070 to Kerkman et al., issued Nov. 16, 2004 and assigned to the assignee of the present application discloses inverter switching control techniques to control reflected voltages in AC motor drives, the entirety of which is hereby incorporated by reference as if fully set forth herein.

U.S. Pat. No. 7,034,501 to Thunes et al., issued Apr. 25, 2007 and assigned to the assignee of the present application discloses gate pulse time interval adjustment techniques for mitigating reflected waves in AC motor drives, the entirety of which is hereby incorporated by reference as if fully set forth herein.

Current source converters, however, do not have a DC link with fixed voltage, and common mode control techniques for voltage source converters are generally not effective for addressing common mode voltages in current source converters. Instead, conventional current source converter common mode voltage control is typically accomplished by addition of isolation transformers and/or common mode output filter circuits including common mode capacitors connected to the output motor leads.

With respect to pulse width modulation techniques, SVPWM is generally simpler and easier to control on the inverter side than SHEPWM. However, space vector modulation typically generates more common mode voltage on the link choke than does SHEPWM. As a result, the link choke is typically designed for high saturation levels, for instance, where the choke can be 20 to 30% larger where the inverter uses SVPWM than if SHE is used. This increases the cost, size, and weight of the link choke. Accordingly, there is a continuing need to control or reduce common mode currents and voltages in power conversion systems to allow link chokes and other system components to be better optimized.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. The present disclosure provides methods and apparatus for common mode reduction techniques based on SVPWM zero vector selection to reduce the saturation level of the SVPWM for power converters while facilitating reduction in the cost of common mode chokes or without over-sizing the choke by using SVPWM. These techniques can be employed in CSC and/or VSC type converters, and may be used in motor drives or other forms of power converters. In certain embodiments, zero vector selection is used to try to counteract computed or estimated active vector common mode contributions. In other cases, zero vectors are selected to counteract measured common mode voltages or currents. Moreover, the zero vector selection may be done to counteract the combined common mode contributions of multiple converter stages (e.g., rectifier and inverter), and the techniques can also be used in matrix converters. Moreover, common mode reduction techniques are presented in which zero vector selection is done without extensive common mode computations by using the status of the inverter as being either motoring or regenerating to select the SVM zero vectors.

In accordance with one or more aspects of the disclosure, a power conversion system is disclosed with rectifier and inverter stages coupled by an intermediate DC circuit and operated by a switch control system, which can be a CSC or VSC type system in various embodiments. One of the rectifier and inverter is operated by SVPWM with the switch control system selecting one of a plurality of zero vectors for space vector modulation based at least partially on a common mode contribution of active vectors used in space vector modulation of the corresponding converter stage.

In certain embodiments, the zero vector is selected so that a zero vector common mode contribution tends to counteract the common mode contribution of the active vectors used in space vector modulation of the corresponding converter stage. In certain embodiments, moreover, an active vector common mode contribution is determined based at least partially on AC voltages, active vectors and dwell times corresponding to a current SVM reference vector, and a zero vector is selected for which a polarity of the corresponding zero vector common mode contribution is opposite to the polarity of the active vector common mode contribution.

In certain embodiments, the zero vector for space vector modulation of the first converter is selected at least partially according to a common mode contribution of the second converter. In certain embodiments, the switch control system for the first converter determines an active vector common mode contribution of the first converter, determines a common mode contribution of the second converter, and determines the combined common mode contribution of these. The switch control system then selects the zero vector for space vector modulation of the first converter for which the polarity of the corresponding zero vector common mode contribution is opposite to the polarity of the combined common mode contribution. In some embodiments, moreover, both the rectifier and inverter are operated by SVPWM. The switch control system determines active vector common mode contributions of the inverter and of the rectifier, and selects zero vectors for the rectifier and for the inverter to at least partially counteract the active vector common mode contributions of the converters.

In accordance with further aspects of the disclosure, a CSC or VSC power conversion system is provided, which includes rectifier and inverter stages and an intermediate DC circuit. A switch control system operates one of the converters by SVPWM with a zero vector selected based at least partially on a measured common mode current. In certain embodiments, the zero vector is selected for which a corresponding zero vector common mode contribution tends to counteract the measured common mode current. In certain embodiments, both the rectifier and inverter are operated by SVPWM, and the switch control system selects zero vectors for the rectifier and inverter to at east partially counteract the measured common mode current.

In accordance with other aspects of the disclosure, a power conversion system is provided, having a rectifier and an inverter coupled with an intermediate DC circuit, and which can be a current source converter in certain embodiments. A switch control system provides space vector modulated control signals to operate the inverter, and selects the SVM zero vector based at least partially on whether the inverter is motoring or regenerating. In certain embodiments, the zero vector is selected which shorts or bypasses an inverter phase not used in only one of the current SVM active vectors for motoring operation, and if the inverter is regenerating, the zero vector is selected which shorts an inverter phase used in both active vectors.

An AC-AC matrix converter is provided in accordance with further aspects of the disclosure, which includes a multiphase AC input and a multiphase AC output, and a switching network coupled therebetween. The converter includes a switch control system that operates the switching network using SVPWM and selects a SVM zero vector based at least partially on a measured or estimated common mode current or voltage. In certain embodiments, the switch control system selects a SVM zero vector for which a corresponding zero vector common mode contribution tends to counteract a common mode contribution of active vectors used operating the switching network.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
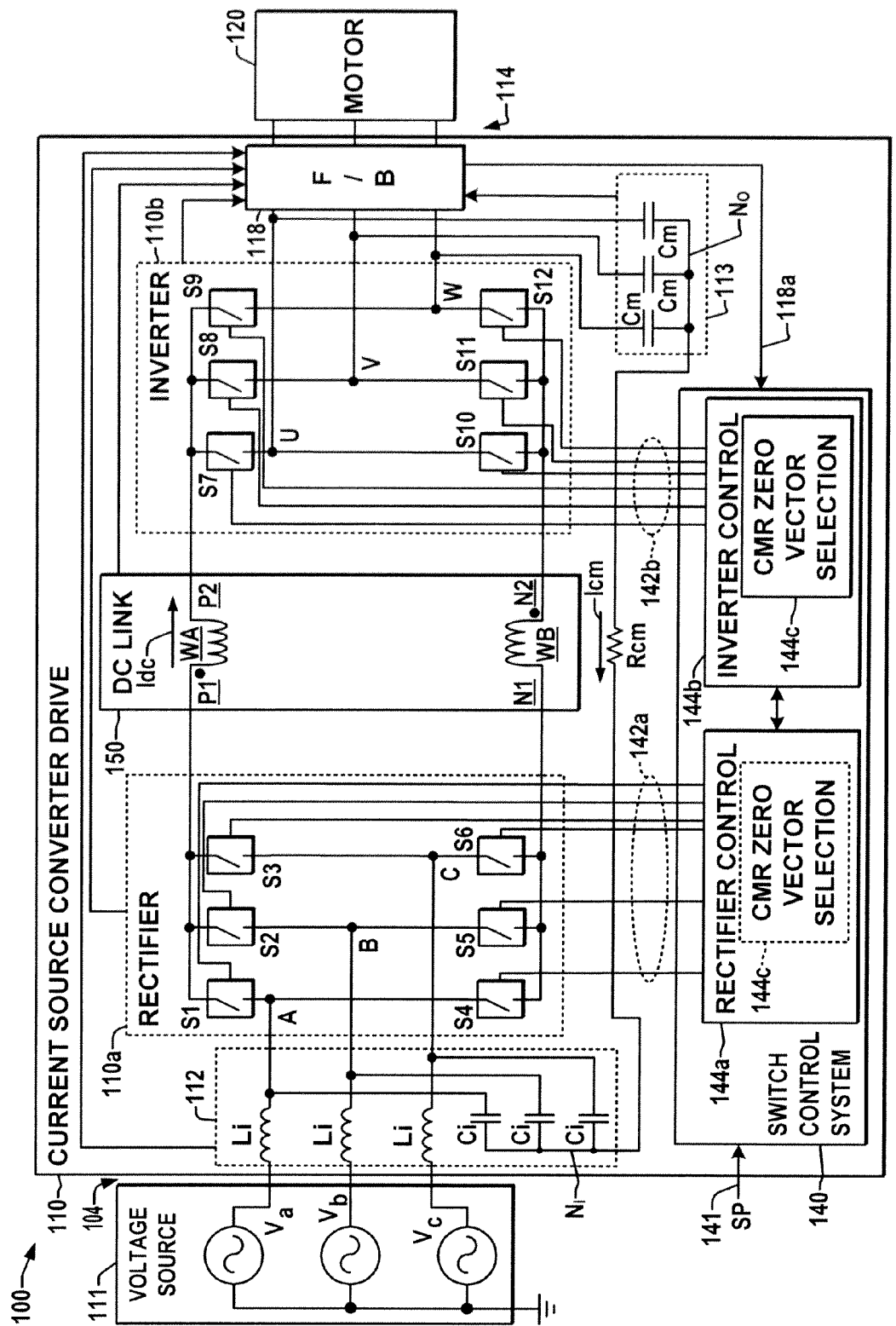
FIG. 1 is a schematic diagram illustrating an exemplary variable frequency motor drive power conversion system with at least one common mode reduction zero vector selection component according to one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale. The disclosed examples provide common mode voltage and/or current control or reduction techniques and apparatus illustrated in the context of motor drive type power conversion systems, but other embodiments are possible in which these techniques can be employed in any form of electrical power converter. Intelligent space vector modulation PWM switching control is used in these embodiments to advantageously control operation of one or more power converter stages of a conversion system while addressing common mode issues by selection of zero vectors for use in space vector modulation control of converter switching devices. These techniques can be used in association with either or both of current source converter (CSC) and/or voltage source converter (VSC) type systems, as well as with matrix converter architectures, for any common mode reduction or control goals, for instance, to facilitate reduction in the size, weight, and cost of common mode chokes and other components such as filter inductors, etc. of the system. Some examples of these techniques include selecting SVM zero vectors so as to counteract computed or estimated active vector common mode contributions and/or to counteract measured common mode voltages or currents. Separately or in combination, the zero vector selection may be done to counteract the combined common mode contributions of multiple converter stages (e.g., rectifier and inverter), and other embodiments are disclosed in which the zero vector is selected according to the inverter motoring or regenerating status without requiring computation of common mode current or voltage estimates.

FIG. 1 illustrates an exemplary system 100 in which a number of these common mode reduction zero vector selection techniques can be employed. The system includes a current source converter (CSC) type motor drive 110 (power conversion system) driving a motor load 120. The system 100 includes an exemplary three-phase AC voltage source 111 providing input power to the drive 110, and the drive 110 converts the input power to drive a motor load 120 coupled to a converter output 114. The drive 110 is a current source converter (CSC) type, with an input 112 connected to the AC power source 111. While these examples are illustrated as having a three phase input 112, other embodiments may provide a single phase AC input or may include a multiphase input adapted to receive three or more input phases.

The CSC drive 110 in FIG. 1 provides variable frequency, variable amplitude single or multiphase AC output power at output terminals 114 to drive an AC motor load 120, which has three phase windings in the illustrated example. The output 114 in other embodiments may provide a single phase AC output or may be of any number of phases, and may power a load other than a motor, such as a power grid in a wind energy system, for example. The illustrated motor drive 110 includes both input filter capacitors Ci in the input circuit 112, as well as output filter capacitors Cm in an output filter circuit 113. The input filter capacitors Ci are coupled between corresponding input phase lines A, B, and C and an input neutral node ($N_I$). The output capacitors Cm are individually coupled between a corresponding output phase line U, V, and W and an output neutral node "o" ($N_O$). Certain embodiments may omit either or both of the input or output filter capacitor sets. The input and output neutral nodes $N_I$, $N_O$ may be floating in certain embodiments, or one or both of the neutrals $N_I$, $N_O$ may be coupled to the ground of the input power source or to another ground. In the illustrated embodiment, the neutrals $N_I$, $N_O$ are coupled to one another through a sense impedance Rcm without reference to any system ground for measurement of one or both of common mode currents $i_{cm}$ and/or common mode voltages or other sensed operating conditions of the drive 110 from which common mode currents and/or voltages can be computed, estimated or otherwise determined by components of a feedback system 118.

The drive 110 includes a rectifier 110a receiving the AC input power from the source 111 via an input 112, as well as an intermediate DC circuit 150 with a DC link choke having upper and lower windings WA and WB coupled between the rectifier 110a and an output inverter 110b. In certain embodiments, the DC link could be a simple DC link inductor or a common mode choke with windings in each of the upper and lower Dc current paths as in the illustrated example. The illustrated drive 110 provides input filtering including inductors Li in each input phase and input filter capacitors Ci coupled between the input lines A, B, C, and the input neutral node g ($N_I$). The rectifier 110a is a current source rectifier (CSR) coupled with a current source inverter (CSI) 110b by the intermediate DC circuit 150, and one or more isolation components (e.g., transformers, not shown) may optionally be included in the drive 110. The output 114 provides AC electrical output power to the motor load 120 via lines U, V, and W, and includes filter circuit 113 with the output capacitors Cm coupled between the load 120 and the output neutral node o ($N_O$).

The rectifier 110a is an active switching-type current source rectifier (CSR) with switching devices S1-S6 coupled between the input 112 and the DC circuit 150 and operates according to a plurality of rectifier switching control signals 142a provided by a rectifier control component 144a of a switch control system 140. In operation, the AC input power is switched by the rectifier switches S1-S6 to create an intermediate DC link current Idc in the intermediate circuit 150. The exemplary inverter 110b is a current source inverter (CSI) that includes switching devices S7-S12 coupled between the DC circuit 150 and phase lines U, V, and W of the output 114. The inverter switches S7-S12 are operated according to corresponding switching control signals 142b from an inverter control component 144b of the switch control system 140 to selectively convert DC power from the DC circuit 150 to provide the AC output power to drive the motor load 120.

In the intermediate DC (link) circuit 150, the DC link choke or inductor links the switches of the rectifier 110a and the inverter 110b, and provides forward and return current paths therebetween. The first winding WA of the link choke is coupled in a forward or positive DC path and has a first end P1 connected to the upper rectifier switches S1-S3 and a second end P2 coupled with the upper inverter switches S7-S9. The second (lower) winding WB is coupled in a negative or return DC path and has a first end N1 coupled to the lower rectifier switches S4-S6 as well as a second end N2 coupled to the lower inverter switches S10-S12.

The rectifier and inverter switching devices S1-S12 may be any suitable controllable electrical switch types (e.g., SGCTs, IGCTs, GTOs, thyristors, IGBTs with reverse blocking capability, etc.) that are controlled according to any suitable type or form of switching scheme or schemes, such as phase control, pulse width modulation, etc., in open or closed-loop fashion. In certain embodiments, the switching devices S7-S12 of the inverter 110b are forced commutated devices including without limitation SGCTs, IGBTs or GTOs, and the switching devices S1-S6 of the rectifier 110a can be force commutated devices such as those mentioned above as well as line commutated devices such as Thyristors. In this regard, Thyristor devices could be used for the inverter switching devices S7-S12 in the form of forced commutated devices with extra circuitry added to the device triggering circuit, triggering circuit commutation.

The rectifier 110a and the inverter 110b operate under control of the switch control system 140, which may include one or more processors and associated memory as well as I/O circuits including driver circuitry for generating switching control signals 142 to selectively actuate the switching devices S1-S12 although separate switching control systems may be employed, for example, with interconnections and information sharing to facilitate the coordinated operation of the rectifier 110a and the inverter 110b. The switch control system 140 in these embodiments includes an inverter control component 144b providing the inverter switching control signals 142b to cause the inverter 110b to selectively convert DC current from the intermediate DC circuit 150 to provide AC electrical power to the AC output 114 according to one or more setpoints 141, such as desired motor speed, torque, etc. The switch control system 140 and the components 144 thereof can be implemented as any suitable hardware, processor-executed software, processor-executed firmware, programmable logic, or combinations thereof, operative as any suitable controller or regulator by which the motor 120 is controlled according to one or more desired profile(s) or setpoint(s) 141, whether signals and/or digital values, in open or closed-loop fashion or combinations thereof.

In operation, moreover, a rectifier control component 144a of the controller 140 provides the rectifier switching control signals 142a to cause the rectifier 110a to convert AC electrical input power to provide a regulated DC current Idc to the DC circuit 150. In doing so, the rectifier controller 144a may employ one or more feedback signals or values 118a, such as a measured DC current value from the rectifier 110a representing the actual DC link current Idc and/or DC link voltage. The DC link current Idc from the rectifier 110a provides input current for conversion by the inverter 110b, where the exemplary inverter control 144b may provide a desired DC link current signal or value as a regulation setpoint to the rectifier controller 144a. In this manner, the rectifier 110a provides the DC current required by the inverter 110b, and the rectifier controller 144a may also implement other control functions such as power factor correction, while the inverter controller 144b performs the necessary motor control operation of the drive 110 according to one or more setpoint values or signals 141.

The drive 110 also includes a feedback system 118 including one or more sensing elements operative to provide one or more feedback signals and/or values 118a indicative of electrical conditions at the input 112, the rectifier 110a, the intermediate DC circuit 150, the inverter 110b, the output filter 113, and/or at the output 114. The switch control system 140 may be provided with one or more setpoints or desired values 141 and one or more feedback signals or values 118a from the feedback system 118 by which one or more closed loop motor drive control goals are achieved in normal motor drive operation. Feedback signals or values for the control functions can be based on signals and/or values 118a from the feedback system 118, measured input values (e.g., line voltages, neutral voltages, currents, etc.), and other information, data, etc., which may be in any suitable form such as an electrical signal, digital data, etc., and which may be received from any suitable source, such as one or more sensors, an external network, switches, a user interface associated with the system 100, or other suitable source(s). The feedback circuit 118 provides feedback signal(s) or value(s) to the controller 140 from at least one of the rectifier 110a, the DC circuit 150, and the inverter 110b, and may provide measured motor speed values through appropriate tachometers or other sensors, and/or sensed values from which motor speed, torque, current, and/or voltage, etc. may be determined by the controller 140. In this regard, sensorless motor speed feedback values may be generated internally by the controller 140 via suitable motor models based on the feedback signals or values 118a even for systems having no direct motor speed measurement sensors.

Referring also to FIGS. 2-9B, in order to combat common mode issues, the switch control system 140 includes one or more zero vector selection components 144c, which can be implemented individually as part of either or both of the rectifier controller 144a and/or the inverter controller 144b, and which can be integrated. FIGS. 2-9B illustrate exemplary processes by which the switch control system 140 generates pulse width modulated switching control signals 142b for the inverter 110b and/or PWM signals 142a for the rectifier 110a using space vector modulation with zero vector(s) selected in a manner that can facilitate control of or reduction in common mode currents and/or voltages in the system 110. Although the methods of FIGS. 2-9B are illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, processor-executed software, or combinations thereof, in order to provide the common mode reduction pulse width modulation control functionality described herein, and may be employed in any power conversion system including but not limited to the above illustrated drive 110, wherein the disclosure is not limited to the specific applications and embodiments illustrated and described herein.

Figure 2:
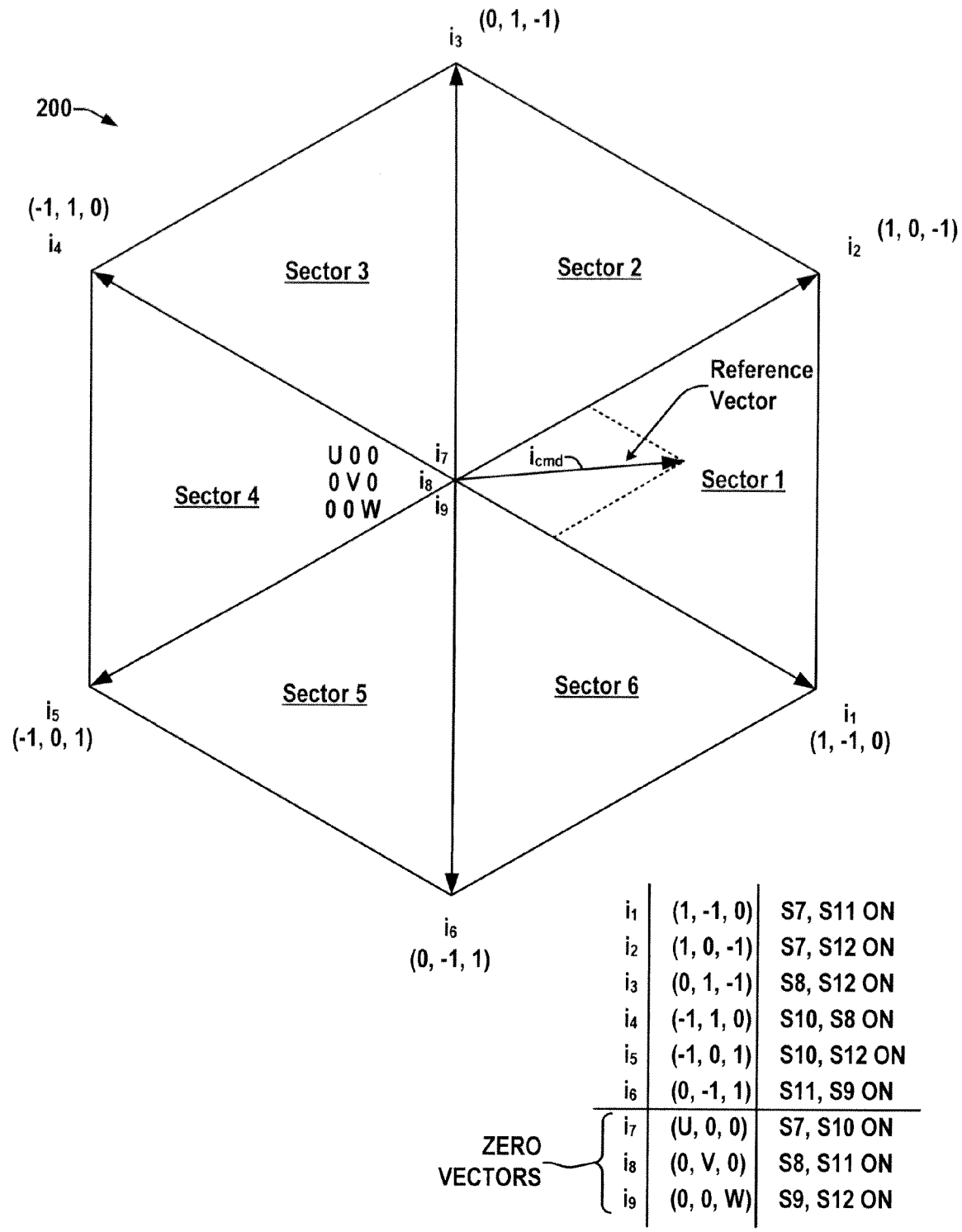
FIG. 2 is a schematic diagram illustrating an exemplary space vector modulation (SVM) diagram of current source converters including six sectors and a rotating reference vector with peripheral corners defining active switching vectors and a center defining a plurality of zero vectors used in the various common mode reduction pulse width modulation schemes of the present disclosure.

Referring also to FIG. 2, the switch control system 140 generates the pulse width modulated switching control signals 142b for the inverter 110b using space vector modulation according to a set of switching sequences for each sector of a space vector modulation diagram 200, or the use of SVPWM may be for certain inverter output frequencies, for instance with selective harmonic elimination (SHE) PWM used for high output frequencies and SVPWM used for low frequencies. Where the converter 110 includes an active rectifier 110a, SHEPWM may be used exclusively, or the rectifier switches may be controlled via SVPWM with intelligent zero vector selection via component 144c. The exemplary zero vector selection techniques are described below in the context of inverter SVPWM for controlling the inverter switches S7-S12, but these concepts are applicable to SVPWM control of the rectifier switches S1-S6.

FIG. 2 shows an exemplary space vector modulation diagram 200 for inverter operation with six stationary active space vectors $I_1$-$I_6$ positioned counterclockwise (CCW) around the periphery of the diagram 200 as well as three stationary zero vectors $I_7$-$I_9$ located at the diagram origin, where the active and zero vectors $I_1$-$I_9$ represent unique switching states for the inverter switching network S7-S12. The SVM diagram 200 also defines six triangular sectors (labeled Sector 1 through Sector 6 in FIG. 2) positioned around the origin, each of which is defined by a unique set of two of the active vectors $I_1$-$I_6$ and the zero vectors $I_7$-$I_9$ at the corners of the corresponding triangular segment. To operate the inverter 110b, the switch control system 140 provides the switching control signals 142b according to a selected switching sequence corresponding to the diagram sector in which the reference (e.g., command) vector $i_{cmd}$ is currently located, with the sequence and corresponding dwell times determined at least partially according to one or more feedback signals or values 118a from the feedback system 118 and/or to setpoint information 141. The inverter switching control signals 142b are provided by pulse width modulation according to the vectors and dwell times determined for each vector in the sequence based on the reference vector position.

As seen in FIG. 2, the exemplary SVM convention used herein provides for the following set of active vectors and zero vectors in Table 1, in which a "1" indicates the upper inverter switch for a given output phase (U, V, or W) is "ON" (conductive) while the lower switch for that phase is "OFF" (non-conductive); a "−1" indicates that the upper switch is OFF and the lower switch is ON, and a "0" indicates that both switches of the given phase are OFF.

TABLE 1

| | | |
|---|---|---|
| $i_1$ | (1, −1, 0) | S7, S11 ON |
| $i_2$ | (1, 0, −1) | S7, S12 ON |
| $i_3$ | (0, 1, −1) | S8, S12 ON |
| $i_4$ | (−1, 1, 0) | S10, S8 ON |
| $i_5$ | (−1, 0, 1) | S10, S12 ON |
| $i_6$ | (0, −1, 1) | S11, S9 ON |
| $i_7$ | (U, 0, 0) | S7, S10 ON |
| $i_8$ | (0, V, 0) | S8, S11 ON |
| $i_9$ | (0, 0, W) | S9, S12 ON |

Thus, for the active vector $i_1$, the upper switch S7 of the phase U is ON and the lower switch S10 is OFF, and the lower switch S11 of phase V is on while the corresponding upper switch S8 is OFF, and both switches S9 and S12 of phase W are OFF. For the exemplary active vector $i_2$, the phase U upper switch S7 is ON and the lower switch S10 is OFF, both phase V switches S8 and S11 are OFF, and the phase W upper switch S9 is OFF and the lower switch S12 is ON. With respect to the zero vectors $I_7$-$I_9$ at the SVM diagram origin, the indication "U" indicates that both the upper and lower switches S7 and S10 for inverter phase U are ON so as to short or bypass that output phase for a CSI inverter 110b. Likewise, "V" indicates that both switches S8 and S11 are ON and "W" indicates that both switches S9 and S12 are ON.

To implement the reference vector command $I_{cmd}$, the SVPWM at any given sector can use any one of the zero vectors $I_7$-$I_9$ to achieve the same motor control (inverter output control) performance. The inventors have appreciated that intelligent selection among these zero vectors $I_7$-$I_9$ can be used to combat the adverse effects of common mode issues, and this control capability in certain applications can be leveraged to avoid having to over-size the common mode choke of the DC link circuit 150 in the CSC drive example 110 of FIG. 1. Similar design advantages can be achieved for other converter components in the various applications of these techniques.

Figure 3:
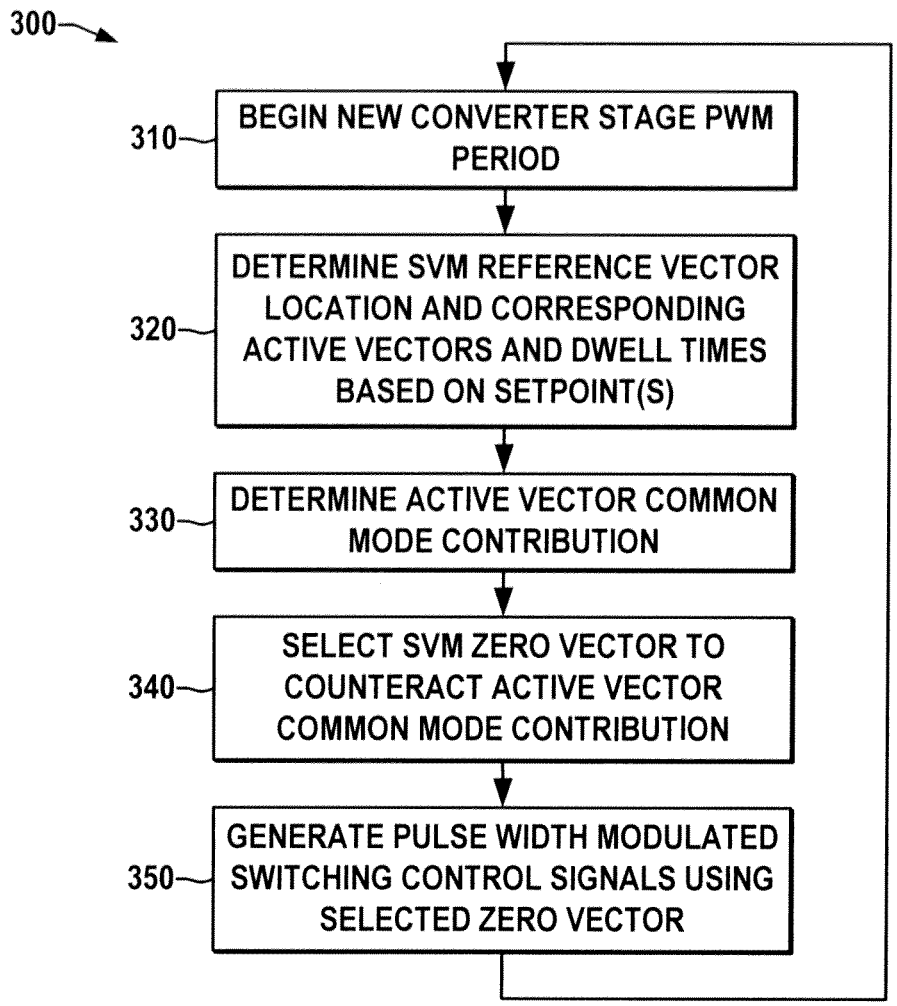
FIG. 3 is a flow diagram illustrating a method and exemplary operation of the switch control system of FIG. 1 in reducing common mode voltages or currents through SVM zero vector selection.

FIG. 3 illustrates an exemplary operating process 300 for one embodiment of the inverter controller 144b, which may be applied to rectifier control in certain embodiments. A new inverter PWM period begins at 310, and the reference vector position (e.g., $I_{cmd}$ in FIG. 2) is determined at 320 along with the pair of active vectors (e.g., and $i_2$ in the example of FIG. 2) corresponding to the sector (e.g., "Sector 1") in which the reference vector is currently positioned. The reference vector angle and magnitude in the space vector diagram 200 also provides for determination at 320 of the corresponding active vector dwell times (e.g., $d_1$ and $d_2$ in this example) as well as a zero vector dwell time (e.g., $d_0$). The pulse width modulation is thus determined as $d_1 i_1 + d_2 i_2 + d_0 i_{7,\ 8,\ or\ 9}$ where the selected zero vector is chosen for common mode reduction. At 330, the switch control system 140 determines the active vector common mode contribution of the SVPWM controlled converter stage (e.g., the inverter 110b).

Any suitable technique can be employed for the determination at 330, for instance, using measured, sensed, derived, or estimated system operating parameters. In one example, to combat common mode currents $i_{cm}$, the controller 140 determines the common mode current contribution attributable to the presently chosen active vectors $i_1$ and $i_2$ as shown in FIG. 2. This can be done by computing the common mode voltage $V_{cm1}$ added to the DC common mode choke by these two differential (active mode vectors for one PWM switching cycle according to the following equation (1):

$$\vec{V}_{cm1} = d_1(V_u + V_v)/2 + d_2(V_u + V_w)/2, \qquad (1)$$

where $d_1$ and $d_2$ are the active vector dwell times for the current reference vector associated with the first and second active vectors $i_1$ and $i_2$, and where $V_u$, $V_v$, and $V_w$ are the corresponding phase voltages measured via the feedback system 118. The common mode voltage stress added to the DC common mode choke $V_{cm2}$ by the zero vectors is within the range given by the following equation (2):

$$d_0 \cdot \min(V_u, V_v, V_w) < V_{cm2} < d_0 \cdot \max(V_u, V_v, V_w), \qquad (2)$$

where $d_0$ is the dwell time for the zero vector. The total common mode voltage $V_{cmi}$ added to the choke for inverter is thus given as the sum in the following equation (3):

$$V_{cmi} = V_{cm1} + V_{cm2}. \qquad (3)$$

The common mode current of the DC link choke in the intermediate circuit 150 can be computed as $V_{cm} = L_{cm} \cdot di_{cm}/dt$, and thus $i_{cm} = \int V_{cm} \cdot dt / L_{cm}$, where Lcm is common mode inductance of the DC link inductor, $V_{cm}$ is the common mode voltage applied on the common mode choke and $V_{cm} = V_{cmr} - V_{cmi}$. As a result, if the integral of $V_{cm}$ is low, the common mode current of the common mode choke will be low.

At 340 in the process of FIG. 3, the switch control system 140 selects the zero vectors $I_7$, $I_8$, or $I_9$ for the inverter space vector modulation at least partially according to the common mode contribution $V_{cm1}$ of the active vectors $i_1$ and $i_2$. In one embodiment, the system 140 selects one of the plurality of zero vectors $I_7$, $I_8$, $I_9$ for which the corresponding zero vector common mode contribution $V_{cm2}$ tends to counteract the active vector common mode contribution $V_{cm1}$ for the inverter 110b in the next switching cycle. The system 140 in certain embodiments uses the measured, derived, or estimated output phase voltages (e.g., line-to-line or line-to-neutral, etc.) via the feedback system 118 and the above equation (2) to ascertain the zero vector contributions $V_{cm2}$ at 330 and makes the selection at 340 so as to wholly or partially counteract the active vector common mode contribution $V_{cm1}$. In this regard, the inventors have appreciated that wholly or at least partially canceling out $V_{cm1}$ by adjusting $V_{cm2}$ through this zero vector selection technique to reduce overall common mode voltage integral ($\int V_{cm} \cdot dt$) in a given cycle can advantageously reduce the common mode current in the system 110. The SVPWM signals 142b are then generated at 350 in FIG. 3 using the selected zero vector $I_7$, $I_8$, or $I_9$.

Figure 4:
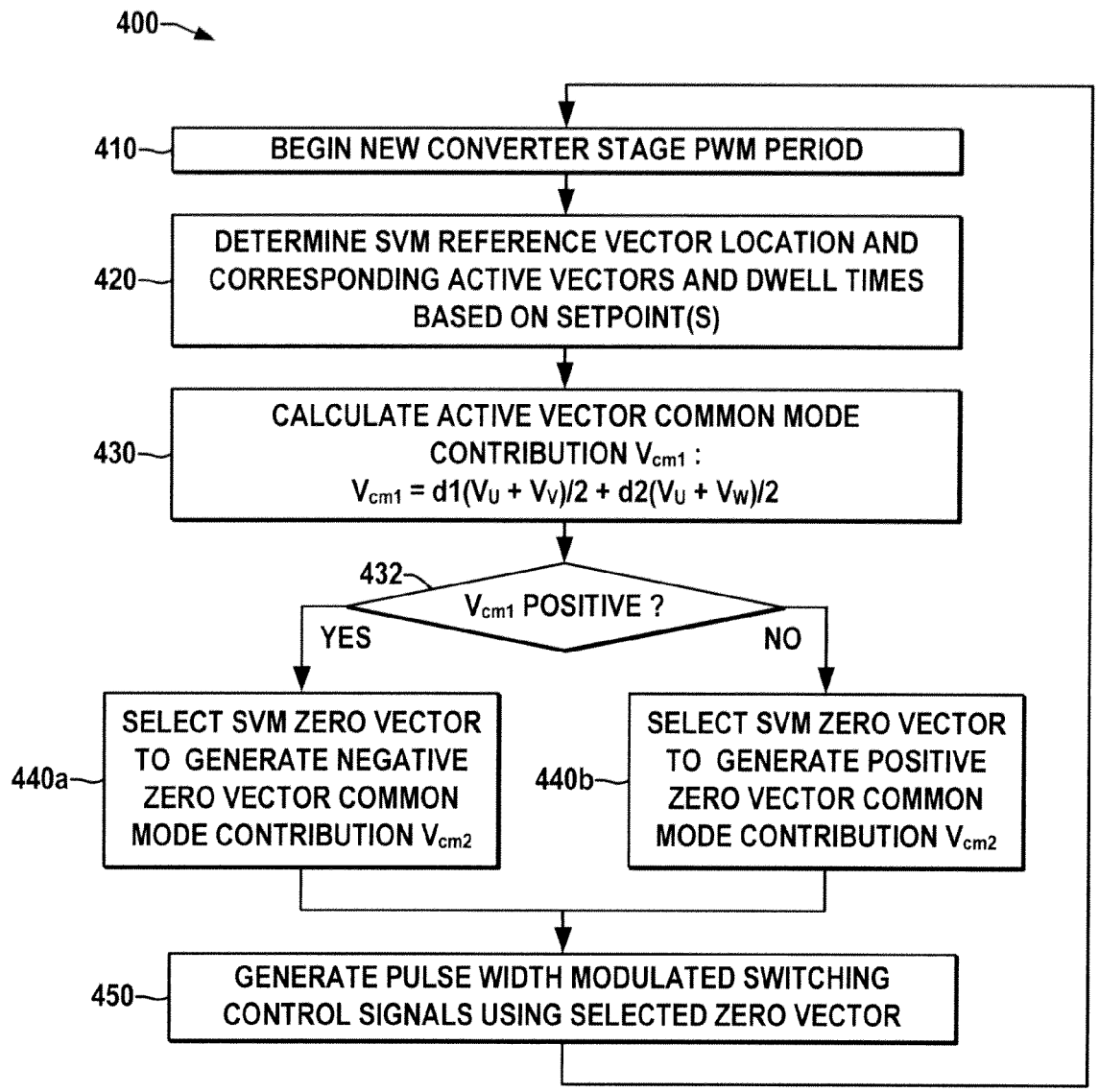
FIG. 4 is a flow diagram illustrating another exemplary method and switch control system operation to reduce common mode voltages or currents through SVM zero vector selection based on active vector common mode polarity.

FIG. 4 shows another exemplary process 400 method and switch control system operation to reduce common mode voltages or currents through SVM zero vector selection based on active vector common mode polarity. At 410, the SVPWM period begins and the reference vector position, active vectors, and dwell times are determined at 420 based at least partially on setpoint value(s) 141 and/or feedback value(s) 118*a*. At 430, the system 140 determines the active vector common mode contribution (e.g., $V_{cm1}$), and a determination is made at 432 as to whether the active vector contribution $V_{cm1}$, is positive or negative. The switch control system 140 then selects one of the plurality of zero vectors $I_7$, $I_8$, $I_9$ at 440 based on the active vector contribution polarity. In particular, the system 140 selects the zero vector for which the polarity of the corresponding zero vector common mode contribution $V_{cm2}$ is opposite to the polarity of the active vector common mode contribution $V_{cm1}$. Thus, if $V_{cm1}$ is positive (YES at 432), the system 140 selects a zero vector $I_7$, $I_8$, or $I_9$ at 440*a* that generates a negative zero vector common mode contribution $V_{cm2}$ (e.g., using the measured output voltages and equation (2) above to determine the prospective zero vector contributions $V_{cm2}$). Conversely, if $V_{cm1}$ is negative (NO at 432), a zero vector $I_7$, $I_8$, or $I_9$ is selected at 440*b* that generates a positive zero vector common mode contribution $V_{cm2}$. The selected zero vector $I_7$, $I_8$, or $I_9$ is then used at 450 to generate the inverter SVPWM signals 142*b*.

Figure 5:
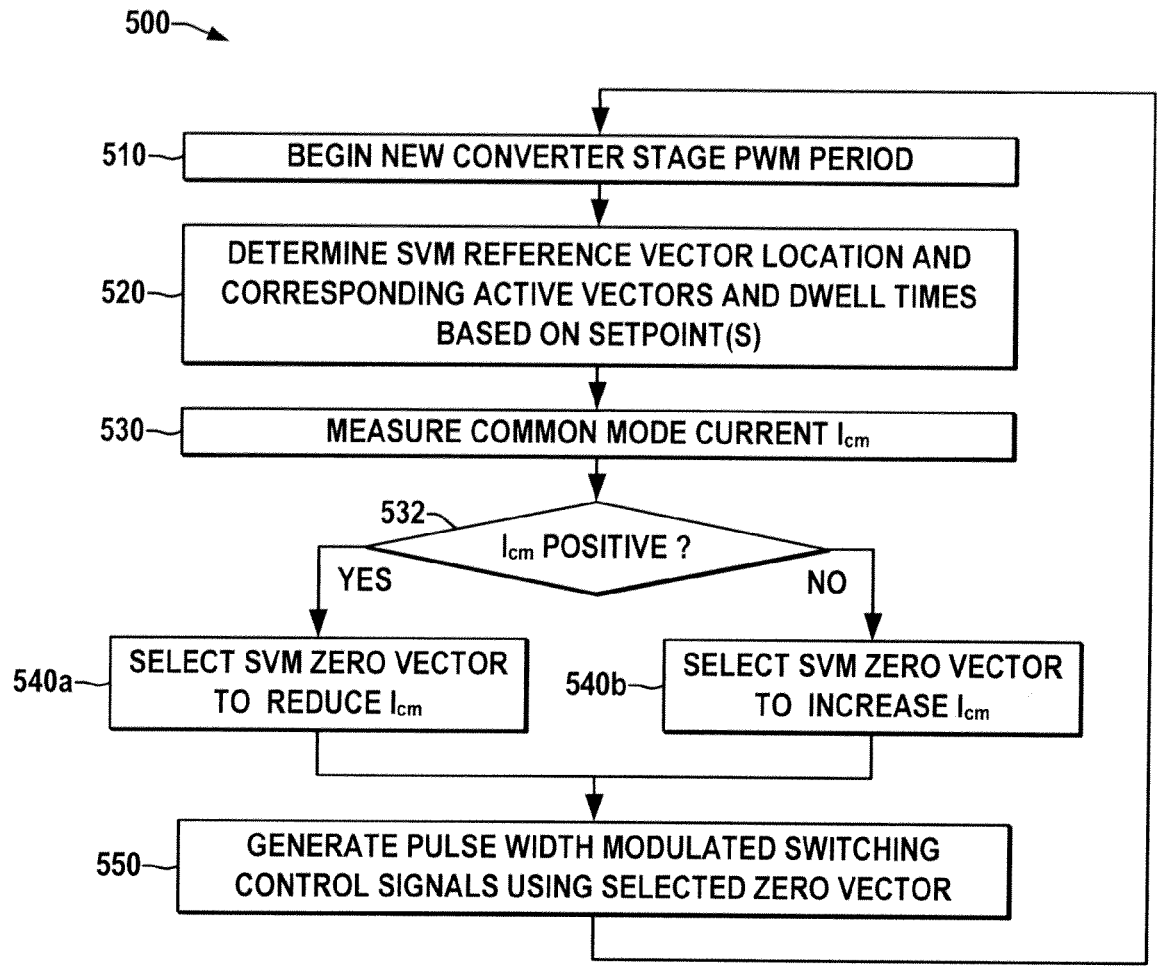
FIG. 5 is a flow diagram illustrating another exemplary method and switch control system operation to reduce common mode by SVM zero vector selection according to the polarity of a measured common mode current.

FIG. 5 illustrates yet another process 500 for switch control system operation in which the zero vector is selected according to the polarity of a measured common mode current $i_{cm}$. The SVPWM period begins at 510 and the reference vector position, active vectors, and dwell times are determined at 520. A common mode current is measured at 530 via the feedback system 118 (e.g., directly as by measuring the voltage across resistor Rcm in FIG. 1, or by derivation from other measured system parameter), and the system 140 selects one of the zero vectors $I_7$, $I_8$, $I_9$ for inverter space vector modulation at least partially according to the measured common mode current $i_{cm}$. In one possible implementation, the common mode current polarity is determined at 532 and the system 140 selects the zero vector at 540 according to this polarity (e.g., using the measured output voltages and equation (2) above to determine the prospective zero vector contributions $V_{cm2}$). In particular, if the current $i_{cm}$ is positive (YES at 532), the switch control system 140 selects a zero vector at 540*a* for which the determined zero vector contributions $V_{cm2}$ (e.g., equation (2)) reduces the common mode current $i_{cm}$, and otherwise (NO at 532 for negative measured $i_{cm}$) selects a zero vector at 540*b* for which the contribution $V_{cm2}$ increases the common mode current $i_{cm}$. The selected zero vector $I_7$, $I_8$, or $I_9$ is then used at 550 to generate the inverter SVPWM signals.

Figure 6:
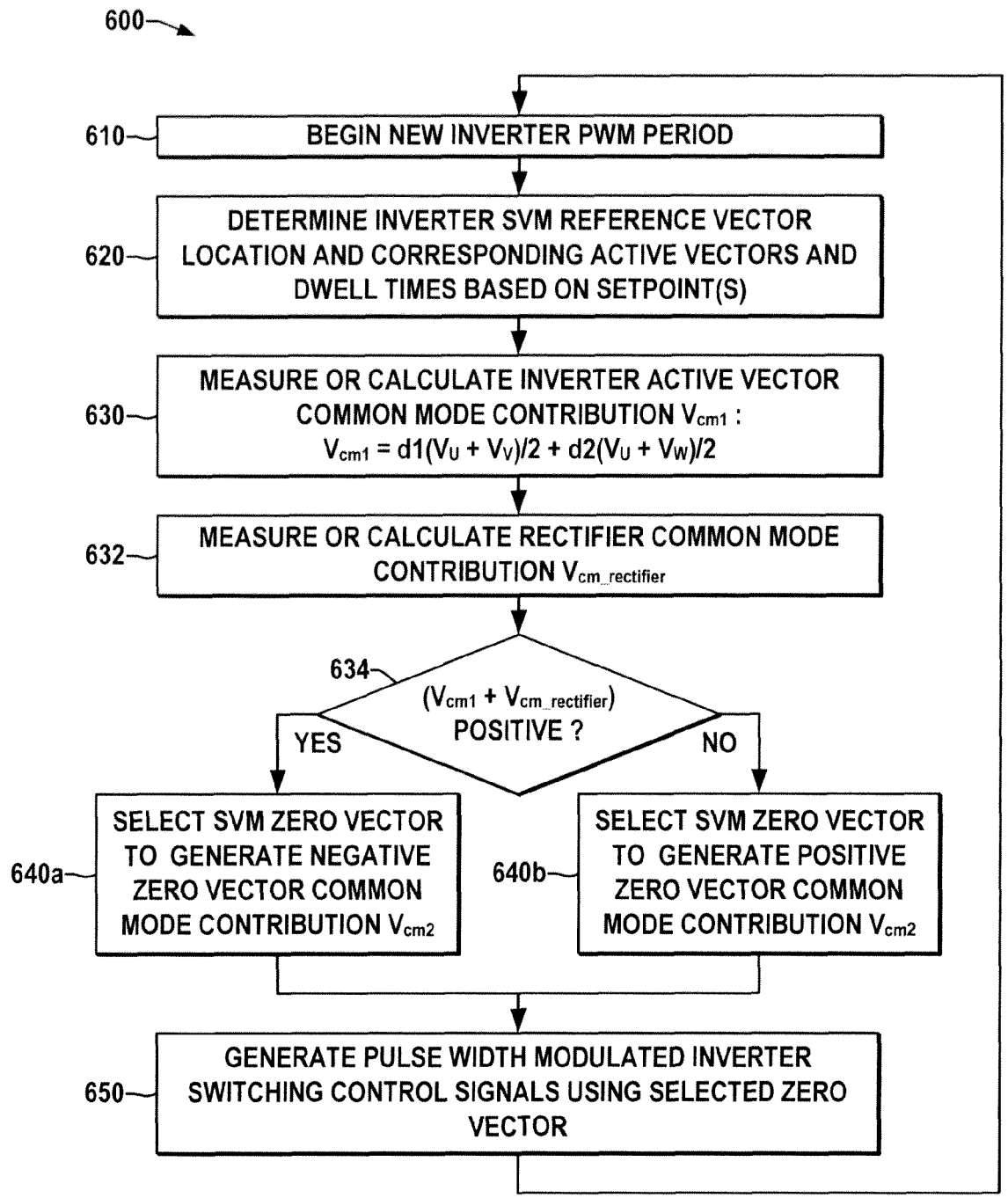
FIG. 6 is a flow diagram illustrating yet another exemplary method and switch control system operation with inverter zero vectors selected according to combined common mode contributions of inverter SVM active vectors and measured or calculated rectifier common mode.

Another switch control system operational process 600 is shown in FIG. 6, in which the inverter zero vector is selected according to combined common mode contributions of inverter SVM active vectors and measured or calculated rectifier common mode. A new PWM period for the inverter 110*b* begins at 610 and the system 140 determines the inverter reference vector position, active vectors, and dwell times at 620. The active vector common mode contribution (e.g., $V_{cmi}$) is determined at 630 (e.g., using equation (1) above), and the common mode contribution $V_{cm\_rectifier}$ of the rectifier 110*a* is measured or calculated at 632. Any suitable technique can be used to determine $V_{cm\_rectifier}$ at 632, for example using equations similar to equations (1) and (2) above if the rectifier is controlled by SVPWM based on measured input voltages and rectifier reference vectors and dwell times. With this information, the switch control system 140 selects the inverter zero vectors $I_7$, $I_8$, or $I_9$ based at least in part on the inverter active vector common mode contribution (e.g., $V_{cm1}$) and on the rectifier common mode contribution $V_{cm\_rectifier}$. In one possible implementation shown in FIG. 6, the system 140 determines a combined common mode contribution $V_{cm1}+V_{cm\_rectifier}$ and determines the polarity of this combined contribution at 634. At 640, the system 140 selects an inverter zero vector $I_7$, $I_8$, or $I_9$ for which the polarity of the corresponding zero vector common mode contribution $V_{cm2}$ is opposite to the polarity of the combined common mode contribution $V_{cm1}+V_{cm\_rectifier}$. For example, if $V_{cmi}+V_{cm\_rectifier}$ is positive (YES at 634), the system 140 selects a inverter zero vector $I_7$, $I_8$, or $I_9$ at 640*a* for which $V_{cm2}$ is negative, and otherwise (NO at 634 for negative $V_{cmi}+V_{cm\_rectifier}$) a zero vector $I_7$, $I_8$, or $I_9$ is selected at 640*b* for which $V_{cm2}$ is positive. The selected zero vector $I_7$, $I_8$, or $I_9$ is then used at 650 to generate the SVPWM signals 142*b*.

The techniques described above in connection with FIGS. 3-6 can also be utilized in SVM control of the rectifier 110*a*, alone or in combination with similar control for space vector modulation control of the inverter 110*b*.

Figure 7:
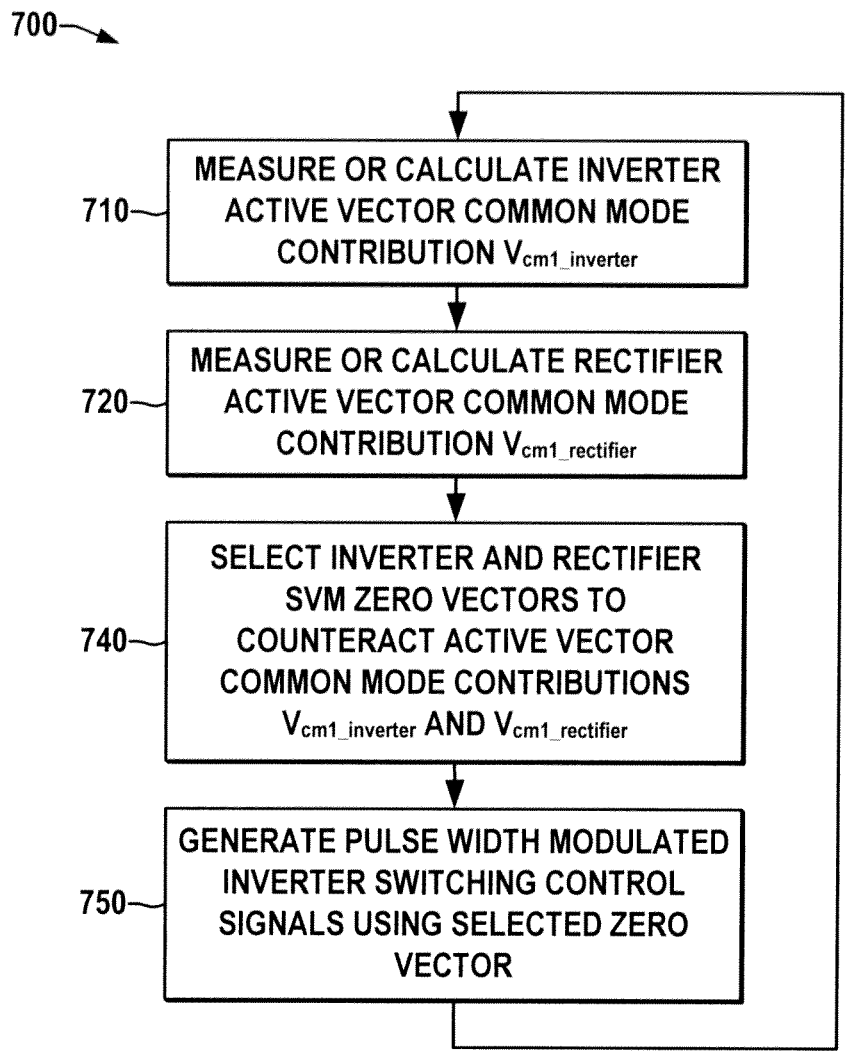
FIG. 7 is a flow diagram illustrating yet another exemplary method and switch control system operation with zero vectors being selected for SVPWM operation of both the rectifier and inverter to counteract active vector common mode contributions of both converters.

Referring also to FIG. 7, a process 700 is illustrated in which zero vectors are selected for SVPWM operation of both the rectifier 110*a* and the inverter 110*b* to counteract active vector common mode contributions of both converters. This is useful for situations in which both the rectifier 110*a* and inverter 110*b* are space vector modulated by the switch control system 140. At 710, the switch control system 140 determines an active vector common mode contribution $V_{cm1\_inverter}$ of the inverter 110*b*, and determines an active vector common mode contribution $V_{cm1\_rectifier}$ of the rectifier 110*a* at 720 (e.g., using equation (1) above). At 740, the system 140 selects zero vectors (e.g., $I_7$, $I_8$, or $I_9$ for the inverter 110*b* and a zero vector for the rectifier 110*a*) so as to at least partially counteract the active vector common mode contributions $V_{cm1\_inverter}$, $V_{cm1\_rectifier}$ of the inverter 110*b* and the rectifier 110*a*. This selection can be by any suitable approach, such as summing the active vector contributions ($V_{cm1\_inverter}+V_{cm1\_rectifier}$) and selecting the zero vectors for the inverter 110*b* and rectifier 110*a* to attempt to offset the combined active vector common mode contribution, which may be done passed on polarities of the contributions as described above. The selected zero vector $I_7$, $I_8$, or $I_9$ is then used at 750 to generate the inverter SVPWM signals 142*b*.

Figure 8:
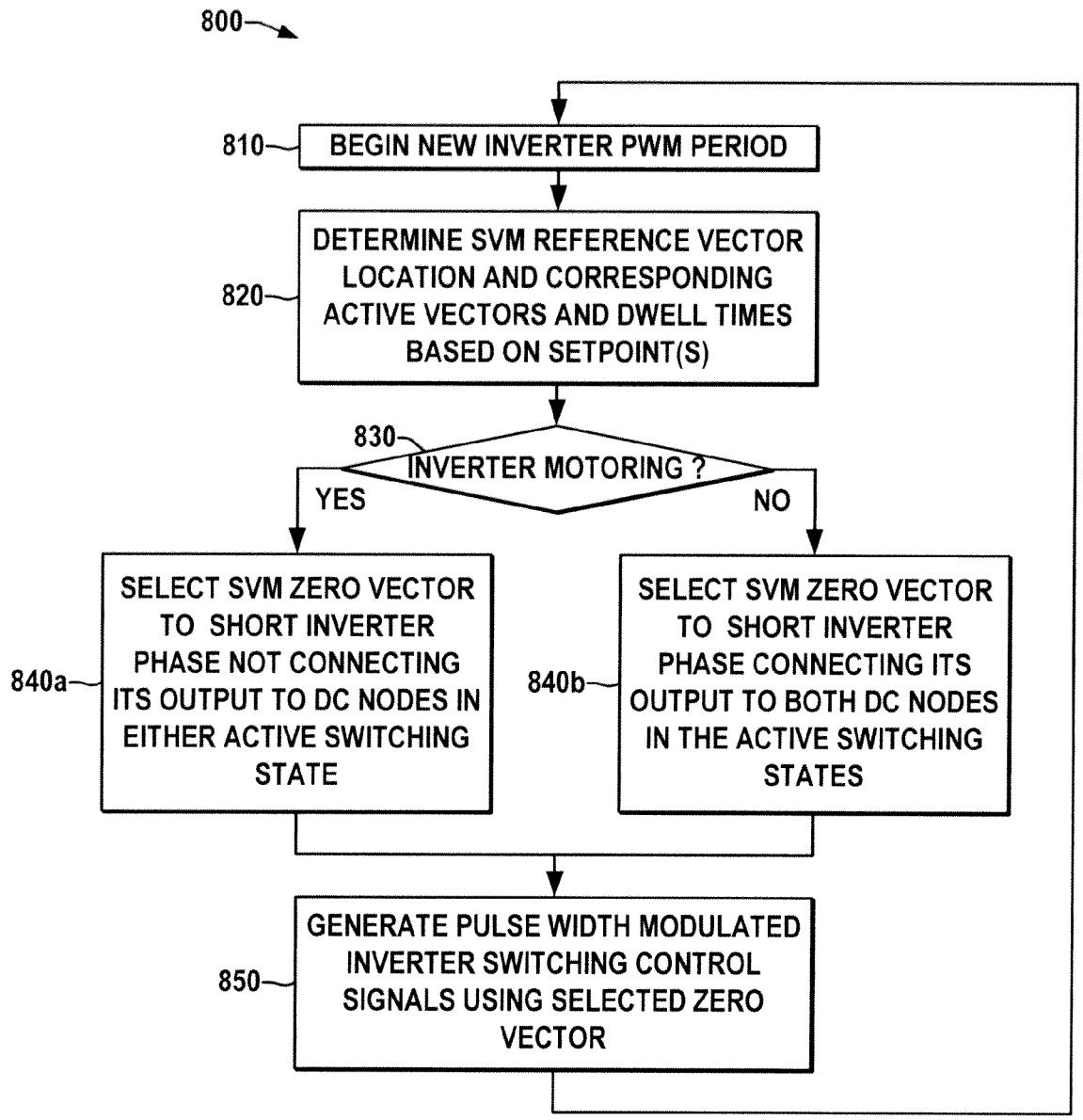
FIG. 8 is a flow diagram illustrating another exemplary method and switch control system operation with inverter zero vector selection based on whether the inverter is motoring or regenerating.
Figure 9A:
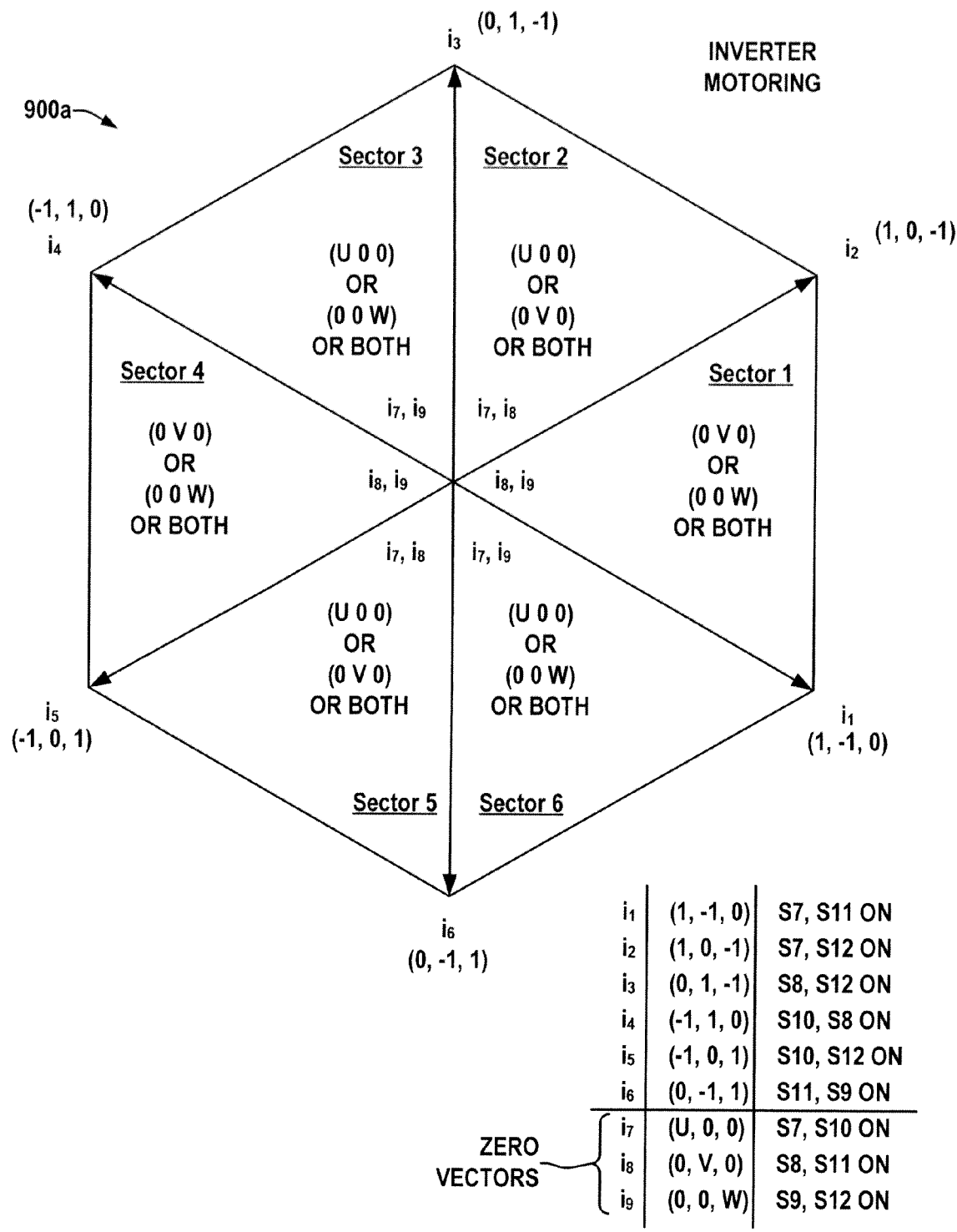
FIGS. 9A and 9B are schematic diagrams illustrating exemplary SVM diagrams showing sector-based zero vector selection based on motoring or regenerating inverter modes, respectively.
Figure 9B:
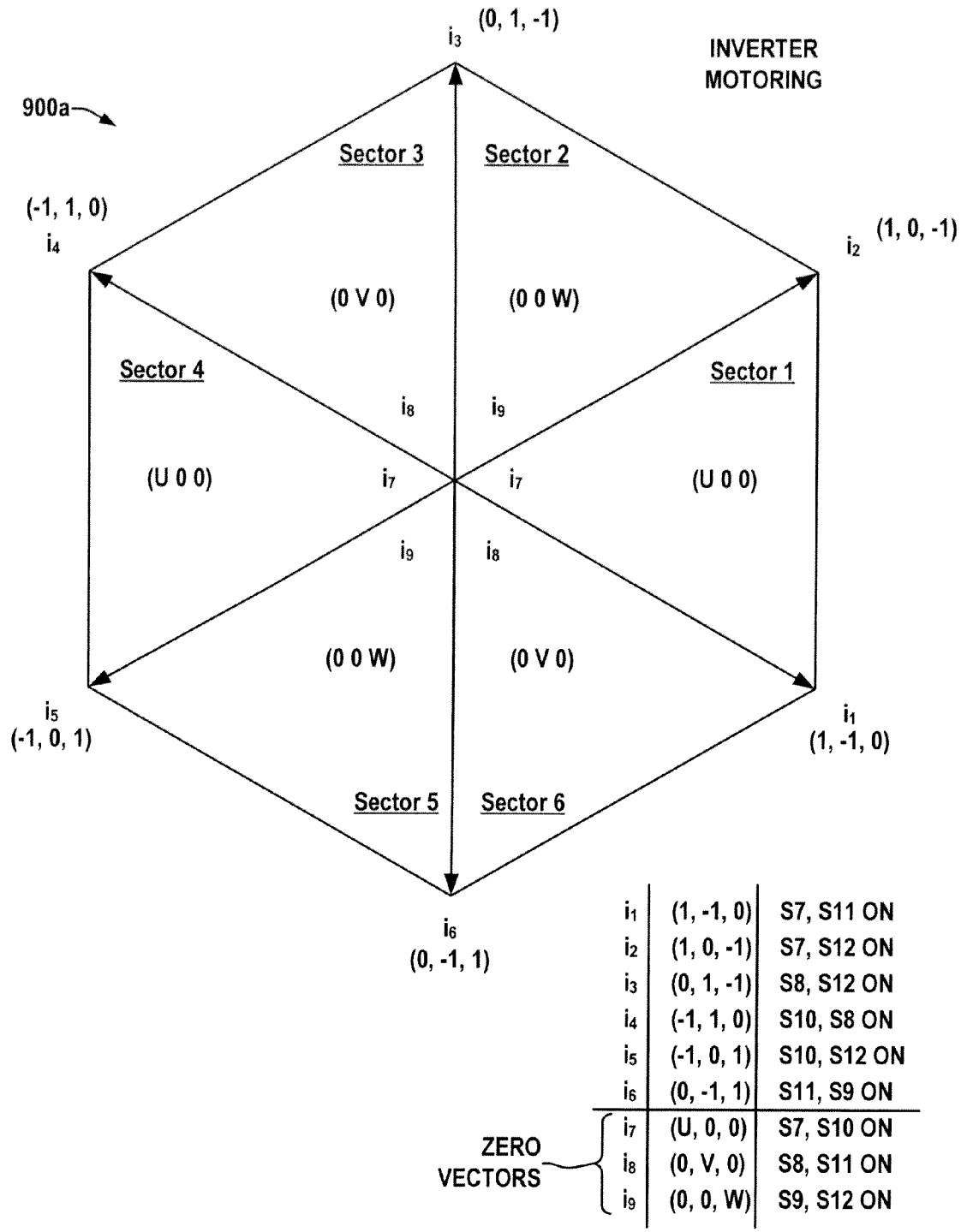

Referring now to FIGS. 8, 9A, and 9B, another exemplary process 800 is shown in FIG. 8 for operating the switch control system 140 with inverter zero vector selection based on whether the inverter is motoring or regenerating, and the SVM diagrams 900*a* and 900*b* in FIGS. 9A and 9B, respectively, illustrate sector-based zero vector selection according to these motoring or regenerating inverter modes. This approach is computationally advantageous since no complex common mode contribution calculations need to be made, and instead the zero vector selection is done based on the attributes of the current reference vector sector in the space vector diagram 900. While this method can reduce the common mode current, it may not minimize it. This technique, moreover, can be employed in any form of converter (e.g., CSC or VSC drive 110) for SVPWM control of an active inverter 110*b*, even where a passive rectifier 110*a* is used. At 810 in FIG. 8, the inverter PWM control period begins and the inverter reference vector position, active vectors, and dwell times are determined at 820. The system 140 determines at 830 whether the inverter 110*b* is currently providing power to the output load 120 (motoring mode) or is instead providing power from the load (e.g., a power grid) to the DC intermediate circuit 150 (regenerating mode). At 840, the system 140 then selects the inverter zero vectors $I_7$, $I_8$, or $I_9$ at least partially according to whether the inverter 110*b* is motoring or regenerating.

In certain embodiments, if the inverter 110*b* is motoring (YES at 830), the switch control system 140 selects the zero vectors $I_7$, $I_8$, or $I_9$ at 840*a* to short an inverter phase not used in only one of the current active vectors determined at 820. This is shown in the SVM diagram 900a of FIG. 9A, where the reference vector sector location determines the zero vector selection for motoring operation. If the reference vector $I_{cmd}$ is in the first sector (Sector 1) bounded by active vectors $i_1$ and $i_2$, for example, the system 140 selects zero vector $i_8$ or vector $i_9$ at 840a since zero vector $i_8$ shorts phase V (both switches S8 and S11 are ON) and phase V was activated by the active vector but not by $i_2$. Thus, the inverter leg is shorted which not connecting its output to either DC node in the active switching vectors. Likewise zero vector $i_9$ can be selected at 840a since this zero vector shorts phase W, which phase was activated by the active vector $i_2$ but not by $i_1$. Similar selections are shown in the diagram 900a of FIG. 9A for motoring operation, which are summarized in the following Table 2:

TABLE 2

| Reference Vector Sector | Zero Vector (motoring mode) |
| --- | --- |
| Sector 1 | $i_8$ or $i_9$ |
| Sector 2 | $i_7$ or $i_8$ |
| Sector 3 | $i_7$ or $i_9$ |
| Sector 4 | $i_8$ or $i_9$ |
| Sector 5 | $i_7$ or $i_8$ |
| Sector 6 | $i_7$ or $i_9$ |

Referring to FIG. 9B, if instead the inverter 110b is regenerating (NO at 830), the system 140 selects the zero vector $I_7$, $I_8$, or $I_9$ at 840b for inverter SVPWM to short the inverter phase that is used in both of the current active vectors. For example, if the reference vector $i_{cmd}$ is in Sector 1, zero vector $i_7$ is selected at 840b since this zero vector shorts phase U, and both the active vectors $i_1$ and $i_2$ use phase U. In this manner, the inverter leg is shorted which is connected to a Dc node in both of the active vectors during the active switching state. The zero vector selection for regenerating mode is summarized in the following Table 3:

TABLE 3

| Reference Vector Sector | Zero Vector (regenerating mode) |
| --- | --- |
| Sector 1 | $i_7$ |
| Sector 2 | $i_9$ |
| Sector 3 | $i_8$ |
| Sector 4 | $i_7$ |
| Sector 5 | $i_9$ |
| Sector 6 | $i_8$ |

The selected zero vector $I_7$, $I_8$, or $I_9$ is then used at 850 to generate the inverter SVPWM signals 142b. This technique can also be used in SVPWM control of an active rectifier 110a, and can be used alone or in combination with one or more of the above described common mode reduction zero vector selection techniques.

Figure 10:
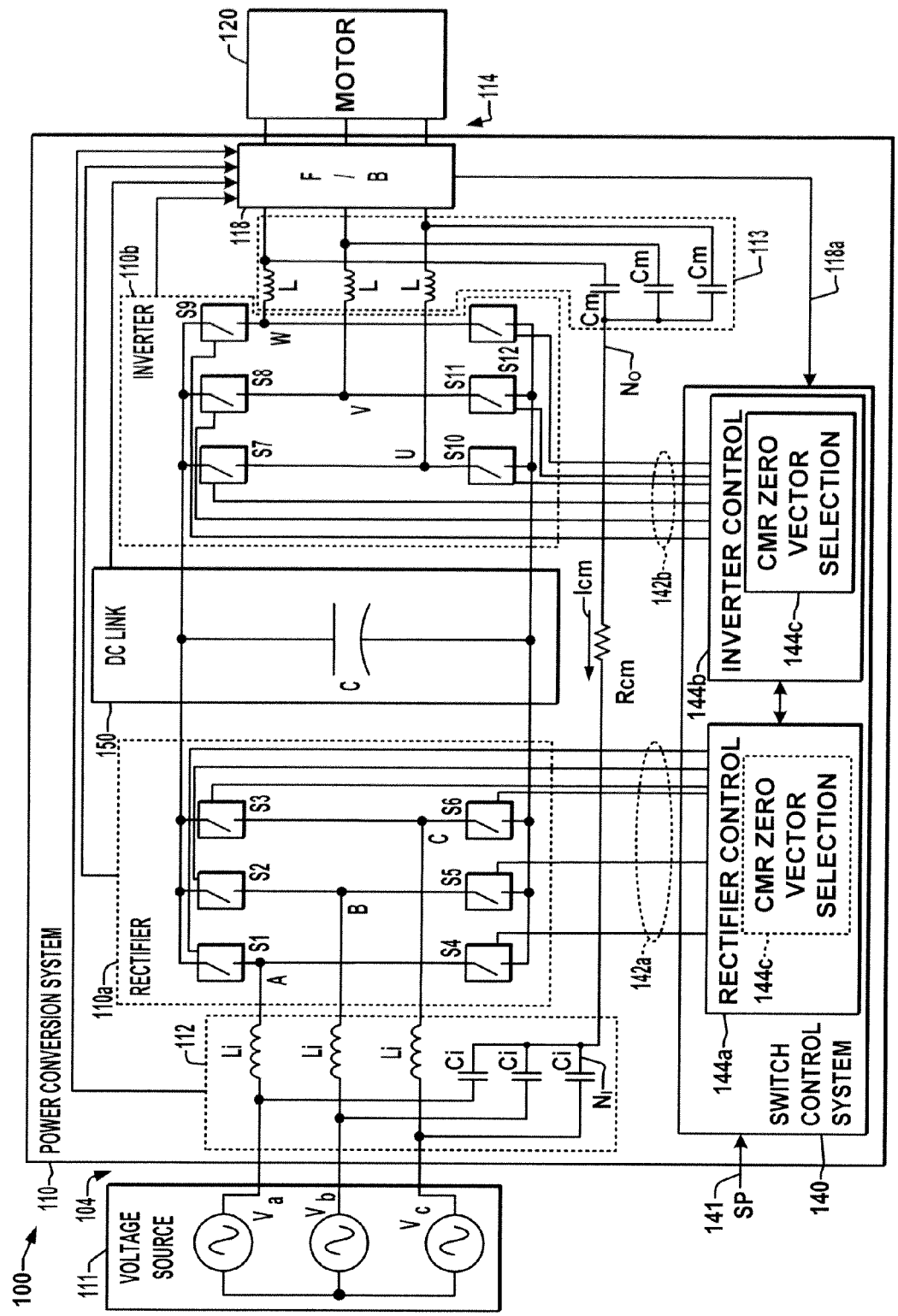
FIG. 10 is a schematic diagram illustrating an exemplary VSC type variable frequency motor drive power conversion system with at least one common mode reduction zero vector selection component.

FIG. 10 shows an exemplary VSC type variable frequency motor drive power conversion system 110 with at least one common mode reduction zero vector selection component 144c in which one or more of the above zero vector selection techniques can be employed to combat common mode voltages and currents. The converter 110 in this example is used to drive a motor load 120. While FIG. 10 illustrates a voltage source converter 110 with an active rectifier 110a, other embodiments are possible using a passive rectifier 110a. The system 100 of FIG. 10 includes an input 104 coupled with a three-phase AC voltage source 111 providing input power to the drive 110, and the drive 110 converts the input power to provide motor voltages to drive a motor load 120 having phase windings with associated inductances Lm coupled to a converter output 114. The drive 110 may include an input filter 112 connected to the AC power source 111 and an output filter 113 including line inductances L. The drive 110 in FIG. 10 provides variable frequency, variable amplitude single or multiphase AC output power at output terminals 114 to drive an AC motor load 120, which has three phase windings in the illustrated example. The output 114 in other embodiments may be of any number of phases, and may power a load other than a motor, such as a power grid in a wind energy system, for example. The motor drive 110 may include input filter capacitors in the input circuit 112, as well as output filter capacitors in an output filter circuit 113. The drive 110 includes a rectifier 110a receiving the AC input power from the source 111 via an input 112, as well as an intermediate DC circuit 150 with a capacitance C (single or multiple capacitors) connected between the upper and lower DC branches. The rectifier 110a is coupled with the inverter 110b by the intermediate DC circuit 150, and one or more isolation components (e.g., transformers, not shown) may optionally be included in the drive 110. A switch control system 140 is provided, as described above in connection with FIG. 1, including a rectifier controller 144a and an inverter controller 144b, either or both of which may include common mode reduction zero vector selection components 144c operative to implement the above described zero vector selection techniques for SVPWM operation of the respective converter stages 110a, 110b.

Figure 11:
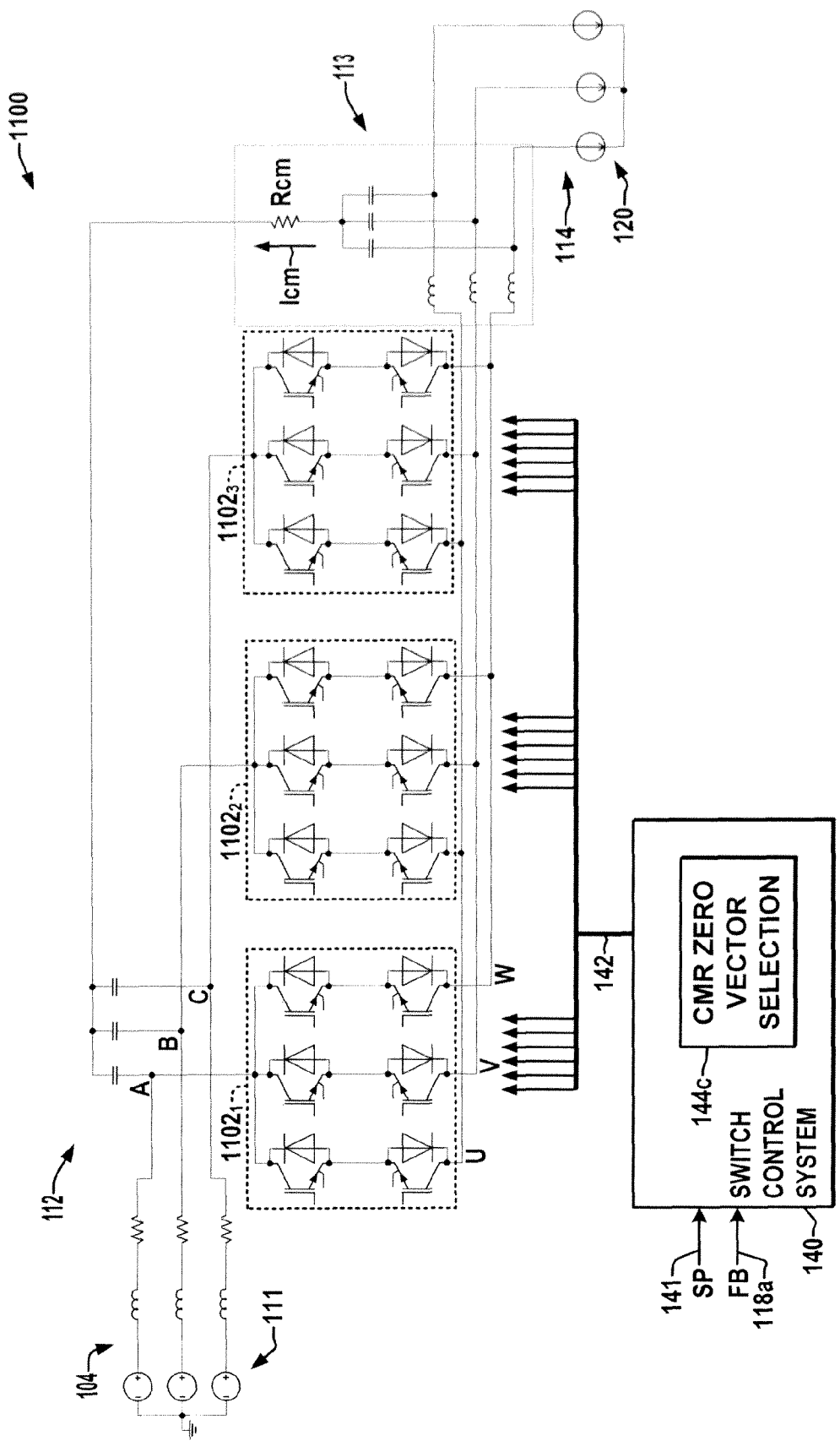
FIG. 11 is a schematic diagram illustrating an exemplary matrix power converter with a common mode reduction zero vector selection component in accordance with certain aspects of the disclosure.

FIG. 11 illustrates an exemplary matrix power converter 1100 with a switching matrix 1102 operated by a switch control system 140 with a common mode reduction zero vector selection component 144c in accordance with further aspects of the disclosure. The system 1100 includes a multi-phase AC input 104 with a plurality of AC input terminals for receiving multi-phase AC electrical input power from a source 111, and may include an input filter circuit 112 (capacitors in this example) coupled with the input lines A, B, and C and providing an input neutral coupled to an output neutral via a common mode resistance Rcm. The system 1100 also has a multi-phase AC output 114 with a plurality of AC output terminals for providing multi-phase AC electrical output power, for instance, to a load 120 (e.g., motor, grind, etc.). The switching network 1102 includes a plurality of switching devices forming a plurality of leg circuits $1102_1$, $1102_2$, and $1102_3$ in the illustrated three-phase example).

The matrix switching devices are operated according to a corresponding switching control signal from the controller 140, with each leg circuit $1102_1$, $1102_2$, $1102_3$ being connected to a corresponding AC input terminal A, B, C and to a corresponding AC output terminal U, V, W, where each leg circuit $1102_1$, $1102_2$, and $1102_3$ includes at least one switching device coupled between the corresponding AC input terminal and the corresponding AC output terminal. The switch control system 140 provides SVPWM switching control signals 142 to cause the switching network 1102 to selectively convert the AC electrical input power from the multi-phase AC input 104 to provide the multi-phase AC electrical output power to the multi-phase AC output 114 based on one or more setpoint signals or values 141. In operation, the switch control system 140 selects one of a plurality of zero vectors (e.g., equivalent to $I_7$, $I_8$, $I_9$ for the matrix configuration) for space vector modulation of the switching network 1102 at least partially according to a measured or estimated common mode current or voltage (e.g., $i_{cm}$). In one embodiment, the system 140 select the zero vector for which a corresponding zero vector common mode contribution tends to counteract a common mode contribution of active vectors used in space vector modulation of the switching network 1102.

In accordance with further aspects of the present disclosure, a non-transitory computer readable medium is provided, such as a computer memory, a memory within a power converter control system (e.g., switch control system 140 above), a CD-ROM, floppy disk, flash drive, database, server, computer, etc. which has computer executable instructions for performing the processes described above.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   a rectifier comprising an AC input having a plurality of AC input nodes to receive AC electrical input power, a DC output with first and second DC output nodes, and a plurality of rectifier devices individually coupled between one of the AC input nodes and one of the first and second DC output nodes to convert the AC electrical input power to provide DC electrical output power to the DC output nodes;
   an intermediate DC circuit comprising at least one inductance or capacitance and first and second DC current paths coupled with the first and second DC output nodes of the rectifier;
   an inverter comprising an AC output with a plurality of AC output nodes for supplying power to a load, and an inverter switching network comprising a plurality of inverter switching devices individually coupled between one of the DC current paths of the intermediate DC circuit and one of the AC output nodes, the inverter switching devices individually operative to selectively electrically couple the corresponding DC current path with the corresponding AC output node according to a corresponding inverter switching control signal; and
   a switch control system, comprising an inverter control component operative to provide the inverter switching control signals to cause the inverter to selectively convert DC current from the intermediate DC circuit to provide AC electrical power to the AC output according to at least one setpoint signal or value, the inverter control component being operative to select one of a plurality of zero vectors for space vector modulation of the inverter at least partially according to whether the inverter is motoring or regenerating.

2. The power conversion system of claim 1, where the switch control system comprises a rectifier control component operative to provide rectifier switching control signals to cause the rectifier to convert AC electrical input power to provide regulated DC power to the intermediate DC circuit, and where a first one of the rectifier control component and the inverter control component is operative to select one of the plurality of zero vectors for space vector modulation of a corresponding first one of the rectifier and the inverter for which a corresponding zero vector common mode contribution tends to counteract the common mode contribution of active vectors used in space vector modulation of the first one of the rectifier and the inverter.

3. The power conversion system of claim 2, where the first one of the rectifier control component and the inverter control component is operative to:
   determine an active vector common mode contribution at least partially according to AC voltages of the first one of the rectifier and the inverter, and active vectors and active vector dwell times corresponding to a current space vector modulation reference vector for controlling the first one of the rectifier and the inverter;
   determine a polarity of the active vector common mode contribution; and
   select one of the plurality of zero vectors for space vector modulation of the first one of the rectifier and the inverter for which a polarity of the corresponding zero vector common mode contribution is opposite to the polarity of the active vector common mode contribution.

4. The power conversion system of claim 1:
   where the switch control system comprises a rectifier control component operative to provide rectifier switching control signals to cause the rectifier to convert AC electrical input power to provide regulated DC power to the intermediate DC circuit;
   where the rectifier control component provides space vector pulse width modulated rectifier switching control signals to the rectifier;
   where the inverter control component provides space vector pulse width modulated inverter switching control signals to the inverter; and
   where the switch control system is operative to:
   determine an active vector common mode contribution of the inverter,
   determine an active vector common mode contribution of the rectifier, and
   select zero vectors for space vector modulation of the rectifier and the inverter to at least partially counteract the active vector common mode contributions of the inverter and the rectifier.

5. The power conversion system of claim 1, where the power conversion system is a voltage source converter and the intermediate DC circuit comprises at least one capacitance.

6. The power conversion system of claim 1, where the power conversion system is a current source converter and the intermediate DC circuit comprises at least one inductance.

7. A power conversion system, comprising:
   a rectifier comprising an AC input having a plurality of AC input nodes to receive AC electrical input power, a DC output with first and second DC output nodes, and a plurality of rectifier devices individually coupled between one of the AC input nodes and one of the first and second DC output nodes to convert the AC electrical input power to provide DC electrical output power to the DC output nodes;

an intermediate DC circuit comprising at least one inductance or capacitance and first and second DC current paths coupled with the first and second DC output nodes of the rectifier;

an inverter comprising an AC output with a plurality of AC output nodes for supplying power to a load, and an inverter switching network comprising a plurality of inverter switching devices individually coupled between one of the DC current paths of the intermediate DC circuit and one of the AC output nodes, the inverter switching devices individually operative to selectively electrically couple the corresponding DC current path with the corresponding AC output node according to a corresponding inverter switching control signal; and a switch control system, comprising an inverter control component operative to provide the inverter switching control signals to cause the inverter to selectively convert DC current from the intermediate DC circuit to provide AC electrical power to the AC output according to at least one setpoint signal or value, the inverter control component being operative to select one of a plurality of zero vectors for space vector modulation of the inverter at least partially according to whether the inverter is motoring or regenerating;

where the inverter control component is operative if the inverter is motoring to select one of a plurality of zero vectors for space vector modulation of the inverter to short an inverter phase not used in at least one of the active vectors corresponding to a current space vector modulation reference vector for controlling the inverter; and where the inverter control component is operative if the inverter is regenerating to select one of a plurality of zero vectors for space vector modulation of the inverter to short an inverter phase used in both active vectors corresponding to the current space vector modulation reference vector for controlling the inverter.

8. The power conversion system of claim 7, where the power conversion system is a current source converter and the intermediate DC circuit comprises at least one inductance.

9. The power conversion system of claim 8:
where the switch control system comprises a rectifier control component operative to provide rectifier switching control signals to cause the rectifier to convert AC electrical input power to provide regulated DC power to the intermediate DC circuit;
where the rectifier control component provides space vector pulse width modulated rectifier switching control signals to the rectifier;
where the inverter control component provides space vector pulse width modulated inverter switching control signals to the inverter; and
where the switch control system is operative to:
determine an active vector common mode contribution of the inverter,
determine an active vector common mode contribution of the rectifier, and
select zero vectors for space vector modulation of the rectifier and the inverter to at least partially counteract the active vector common mode contributions of the inverter and the rectifier.

10. The power conversion system of claim 7, where the power conversion system is a voltage source converter and the intermediate DC circuit comprises at least one capacitance.

11. The power conversion system of claim 7, where the switch control system comprises a rectifier control component operative to provide rectifier switching control signals to cause the rectifier to convert AC electrical input power to provide regulated DC power to the intermediate DC circuit, and where a first one of the rectifier control component and the inverter control component is operative to select one of the plurality of zero vectors for space vector modulation of a corresponding first one of the rectifier and the inverter for which a corresponding zero vector common mode contribution tends to counteract the common mode contribution of active vectors used in space vector modulation of the first one of the rectifier and the inverter.

12. The power conversion system of claim 11, where the first one of the rectifier control component and the inverter control component is operative to:
determine an active vector common mode contribution at least partially according to AC voltages of the first one of the rectifier and the inverter, and active vectors and active vector dwell times corresponding to a current space vector modulation reference vector for controlling the first one of the rectifier and the inverter;
determine a polarity of the active vector common mode contribution; and
select one of the plurality of zero vectors for space vector modulation of the first one of the rectifier and the inverter for which a polarity of the corresponding zero vector common mode contribution is opposite to the polarity of the active vector common mode contribution.

13. The power conversion system of claim 7:
where the switch control system comprises a rectifier control component operative to provide rectifier switching control signals to cause the rectifier to convert AC electrical input power to provide regulated DC power to the intermediate DC circuit;
where the rectifier control component provides space vector pulse width modulated rectifier switching control signals to the rectifier;
where the inverter control component provides space vector pulse width modulated inverter switching control signals to the inverter; and
where the switch control system is operative to:
determine an active vector common mode contribution of the inverter,
determine an active vector common mode contribution of the rectifier, and
select zero vectors for space vector modulation of the rectifier and the inverter to at least partially counteract the active vector common mode contributions of the inverter and the rectifier.

* * * * *